United States Patent [19]

Dulaney et al.

[11] 3,916,379

[45] Oct. 28, 1975

[54] ERROR-RATE MONITORING UNIT IN A COMMUNICATION SYSTEM

[75] Inventors: Ernest Neil Dulaney, Clearwater; Richard F. Elmhurst, Largo, both of Fla.

[73] Assignee: Honeywell Information Systems Inc., Waltham, Mass.

[22] Filed: Apr. 8, 1974

[21] Appl. No.: 458,742

[52] U.S. Cl. ................ 340/146.1 AX; 340/146.1 D

[51] Int. Cl.² .......................................... G06F 11/10

[58] Field of Search...340/146.1 D, 146.E, 146.1 AL, 340/146.1 AX; 178/69.5 R

[56] References Cited

UNITED STATES PATENTS

| | | | |
|---|---|---|---|
| 3,315,228 | 4/1967 | Futerfas et al. | 340/146.1 E |
| 3,453,592 | 7/1969 | Yoshiteru | 340/146.1 D |
| 3,471,830 | 10/1969 | McRae et al. | 340/146.1 D |
| 3,473,150 | 10/1969 | McClelland | 340/146.1 D |
| 3,562,710 | 2/1971 | Halleck | 340/146.1 D |
| 3,596,245 | 7/1971 | Finnie et al. | 340/146.1 D |
| 3,622,877 | 11/1971 | MacDavid | 340/146.1 E |
| 3,725,860 | 4/1973 | Kemper et al. | 340/146.1 E |
| 3,760,354 | 9/1973 | Ginn | 340/146.1 D |

*Primary Examiner*—Charles E. Atkinson
*Attorney, Agent, or Firm*—Ronald T. Reiling; Nicholas Prasinos

[57] ABSTRACT

A method and apparatus are disclosed for monitoring the accuracy of electronic data transmitted over a communication channel or telemetry link. An error code is generated for a unit of data transmitted and one for a unit of data received. The error code for a unit of data received is transmitted to the data transmitting station and then compared with the error code representing the unit of data transmitted. Means are provided to synchronize the comparison of error codes so that the two error codes compared represent the same data. After synchronization the bit error rate (BER) is calculated based on the number of miscompares that result for a given quantity of data transmitted. When the system exceeds a predetermined level corrective action is taken.

11 Claims, 8 Drawing Figures

ERROR-RATE MONITORING UNIT IN A COMMUNICATION SYSTEM

BACKGROUND OF THE INVENTION

1. Field of the Invention:

This invention relates generally to data transmission systems and more particularly to monitoring the accuracy of data transmitted over wireless or cable communication systems.

2. Description of Prior Art:

As the uses of computers proliferates there is a growing need for remote terminals to communicate with computers and with computers to communicate with each other. In the checkless society envisioned for the future, for example, there will be a network of bank computers communicating with each other and with computers in the retail and industrial sector such that a transaction in a retail establishment thousands of miles from the customer's bank is immediately recorded via communicating computers. The account of the retail establishment is credited whereas the account of the customer is debited. Similarly a customer's credit may be instantaneously checked. Other uses of data communication too numerous to mention are not only envisioned but in some instances are presently operational.

In such a network of computers it can readily be appreciated that accuracy of the data transmitted is of utmost importance. Whereas some improvements in transmission of data have been made in order to insure that the data transmitted is the data actually received, there is also a need to continuously monitor the transmit/receive communication system so that degradations or malfunctions in the system may be detected at an early stage in order to institute timely corrective action.

Typical monitoring means of prior art consists of apparatus which perform communication system assessment on an interfering basis which requires the transmit/receive communication system to be taken out of service. Other prior art conducts communication performance assessment in presumptive manner by monitoring circuit parameters such as signal to noise ratio, phase distortion, signal level, etc., which is not a direct measure of the data communication system performance. Still other prior art monitors performance of the communication system in such a manner which does not enable detection of degradations in the system prior to system malfunction.

What is needed is a means to monitor data communications systems in an in-service, non-interfering manner, which utilizes a direct measure of system performance such as data error rate and which can predict system malfunctions by determining degrading trends of system performance.

OBJECTS OF THE INVENTION

It is a primary object of the invention to provide an improved error monitoring method and apparatus for electronic data transmitted over a communication system.

It is another object of the invention to provide a monitoring apparatus which is a direct measure of the performance of a transmit/receive data communication system.

It is still another objective of the invention to provide an in-service error monitoring apparatus which performs bit error rate (BER) computation in a manner which does not interfere with the transmit/receive communication systems.

It is still a further object of the invention to determine the operational status of the transmit/receive communication system and predict the point at which a malfunction will occur to facilitate maintenance and minimize down-time of the transmit/receive communication system.

It is yet another object of the invention to provide an error monitoring apparatus in conjunction with a computer which performs bit error rate (BER) computation in a high speed and versatile manner.

A further object of the invention is to provide a method and apparatus for comparing an error code representative of a unit of information transmitted to an error code representative of that same unit of information received.

Still a further object of the invention is to provide a method and apparatus for synchronizing itself so that the error code representative of a unit of information transmitted is in fact compared to the error code representative of the same unit of information that is actually received.

These and other objects of the invention will become apparent from the description of the embodiments of the invention when read in conjunction with the drawings contained herewith.

SUMMARY OF THE INVENTION

The invention comprises an improved method and apparatus for continuously monitoring the accuracy of electronic data transmitted over a communication system. An error code is generated for a predetermined quantity of data transmitted and another error code for the same predetermined quantity of data that is received. The error code for the predetermined quantity of data received is transmitted back to the original data transmitting station and there compared with the error code representing the predetermined quantity of data that is transmitted. Means are provided to synchronize the comparison of error codes so that the two error codes compared represent the same data. After synchronization the bit error rate (BER) is calculated based on the number of miscompares that result for a given quantity of data transmitted. When the system exceeds a predetermined level corrective action may be taken.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

DETAILED DESCRIPTION OF THE INVENTION

General Discussion

Figure 1:
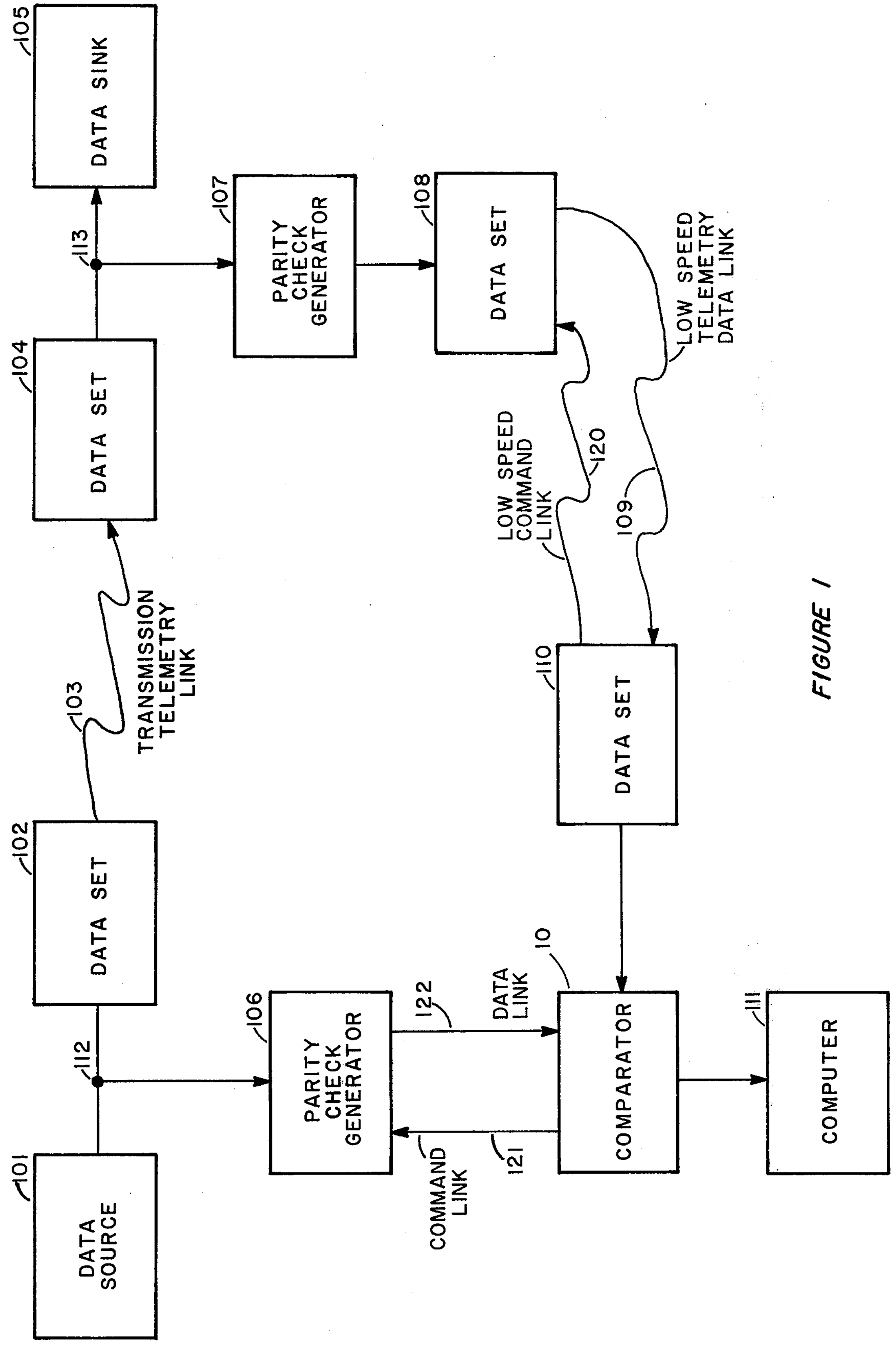
FIG. 1 is a block diagram of a typical transmit/-receive system utilizing the invention.

Referring to FIG. 1, there is shown a general data transmitting and receiving system utilizing the invention. Data from some data source 101 such as a computer or a teletype machine which is in an electronic form suitable for data manipulation is converted to another electronic form in a data set 102 which is suitable for electronic transmission via a telemetry link 103, telephone cables or other electronic signal transmitting means. Generally, the electronic form of data suitable for digital electronic data processing is digital or in the form of high or low electronic signals or electronic pulses, whereas electronic data suitable for transmission is generally in the form of analog electronic signals. The data transmitted in analog form is reconverted in data set 104 to electronic data in digital form where it may be utilized in a data sink 105 such as another computer at the remote station. Because of electronic noise generally generated from various sources such as the various electronic equipment and channels, signals may be lost in the transmission and when reconverted to electronic data in digital form would not represent the data that was actually transmitted. Hence, there is a major problem requiring monitoring of the accuracy of the transmit/receive system to determine that the data that was actually sent was the data that was actually received. It is desirable therefore to calculate the bit error rate (BER) of the system in a continuous manner so as to ascertain that the bit error rate remains below a predetermined level. In order to perform this task, a parity generator 106 generates a parity checking bit for a predetermined unit of data that is being transmitted. Hence, in this particular embodiment, a parity check bit is generated by parity check generator 106 for every block of 100 bits to be transmitted. Similarly, a parity check generator 107 generates a parity check bit for each block of 100 bits of data received. Parity check bit generators are well known in the computer art. (See Chapter 4 of Introduction to *Digital Computer Design* by Herbert S. Sobell, published 1970 by Addison-Wesley Publishing Company, Inc.) Having thus generated a parity check bit for a block of information transmitted and also a parity check bit for that same block of information received, a comparison of the two parity bits would indicate whether or not the same number of bits that were transmitted were received. Accordingly, therefore, a data set 108 transforms the electronic digital parity information into the analog form suitable for transmission. The parity data is then retransmitted by a telemetry link 109 back to data set 110 where it is reconverted back to electronic digital form and compared in comparator 10 with the parity bits generated by parity check generator 106. Errors introduced by telemetry data link 109 are detected by means of a telemetry error code which is added to the transmission message by data set 108. Detection of error laden messages enables comparator 10 to reject the message in error or enables computer 111 to properly weight the resultant miscompare count in such a manner to maintain the accuracy of the BER calculation within tolerable limits. It is essential, however, that the two parity bits compared (i.e., one generated on transmission of a block of data and one generated upon receipt of that block of data) be representative of the same block of data. Accordingly, therefore, there is required a means for synchronizing the parity bits so that there is comparison not only of bits representative of the same data but also of parity bits generated from the same block. These means are more fully described in conjunction with FIGS. 4 and 5 and the method is more fully described in conjunction with FIGS. 3 and 4. Once synchronization of the transmitted and received parity data is accomplished, comparator 10 is utilized together with computer 111 to determine the bit error rate (BER). For example, if a unit of parity bits also consists of 100 bits with each parity bit being the check bit for 100 bits of data transmitted or received, then if there is one miscompare in a unit of 100 parity bits, the error rate is 1 bit for every 10,000 bits transmitted or received. Note that any number of parity bits may also comprise a set of parity bits, just as any number of transmitted data bits comprise a block. In the actual embodiments to be described on FIGS. 4 and 5, a set of parity bits has been chosen as 64 parity bits which may be shifted and temporarily stored in shift registers provided for this purpose.

Figure 2:
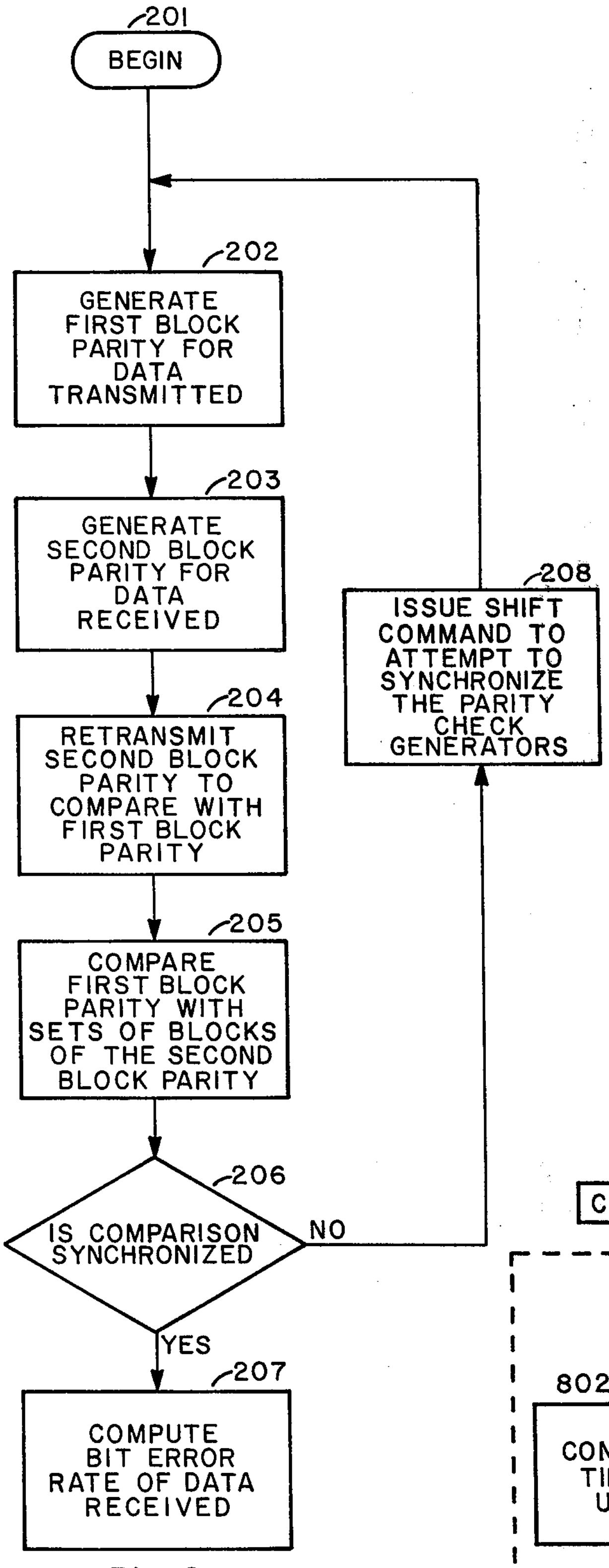
FIG. 2 is a 'broad-brush' flow diagram of the invention.

Referring now to FIG. 2, there is shown in broad-brush flow diagram format the method of computing bit error rate of data received. The process begins at block 201 and a first block parity bit is generated for data transmitted 202. A second block parity bit is generated for data received 203. The second block parity bit generated, or its transformed equivalent, is retransmitted from the receiving station to the transmitting station in order to compare it with the first block parity 204. A comparison of the first block parity bit generated is made with the second block parity bit generated 205. A determination is made as to whether or not the first block parity bit compared with the second block parity bit is representative of the same data 206 i.e., are they synchronized?This is generally done by calculating the bit miscompare rate and if an unusually high bit miscompare rate results, (25 pecent or over) it can be assumed that synchronization has not been accomplished between the parity data transmitted and the parity data received. When starting up the system and with no prior knowledge of the amount of delay in transmission and retransmission, synchronization of the parity data is quite unlikely. Therefore, synchronization of the parity check generators is attempted 208. This synchronization is obtained by delaying the transmitted parity data relative to the received parity data. It will be noted by a perusal of FIG. 1 that there is a certain passage of time required in the transmission of the actual data from data set 102 to data set 104, and there is also a lapse of time required for retransmitting the parity data from data set 108 to data set 110. Accordingly, if the parity bit generated in parity check generator 106 is to be compared in comparator 10 to the parity bit generated in parity bit generator 107 for the same block of data, then the time delay in transmitting the original data and retransmitting the parity data must be taken into account in comparator 10 and in parity check generator 106. The time delay in parity check generator 106 accomplishes synchronization of the parity check generators (resulting in computation of parity on the same sets of data bits at two points 112 and 113 by the two parity check generators 106 and 107). This synchronization is accomplished by issuing a shift command by the comparator 10 to one of the parity check generators 106 or 107 via one of the corresponding command links 120 or 121. In this particular embodiment, the shift command is issued to parity check generator 106. This command will cause the parity check generator 106 to compute parity on sets of data bits at point 112 which have been shifted one data bit relative to the sets of data bits at point 113 upon which parity is being computed by parity check generator 107. After issuance of this command the process returns to operation 202 as shown in FIG. 2. This routine will be repeated until "comparison is synchronized" in operation block 206, confirmed by the fact that the miscompare rate result obtained by comparator 10 is low (less than 25 percent). Under the condition that comparison synchronization has been obtained, bit error rate (BER) of the data received is computed 207. Complete synchronization consists of synchronization of both parity check generators 106 and 107, which results in parity being generated over the same sets of data blocks at points 112 and 113, and synchronization of the generated parity bits by comparator 10 which results in bit for bit comparison of the two sets of parity bits generated by parity check generators 106 and 107.

Figure 3:
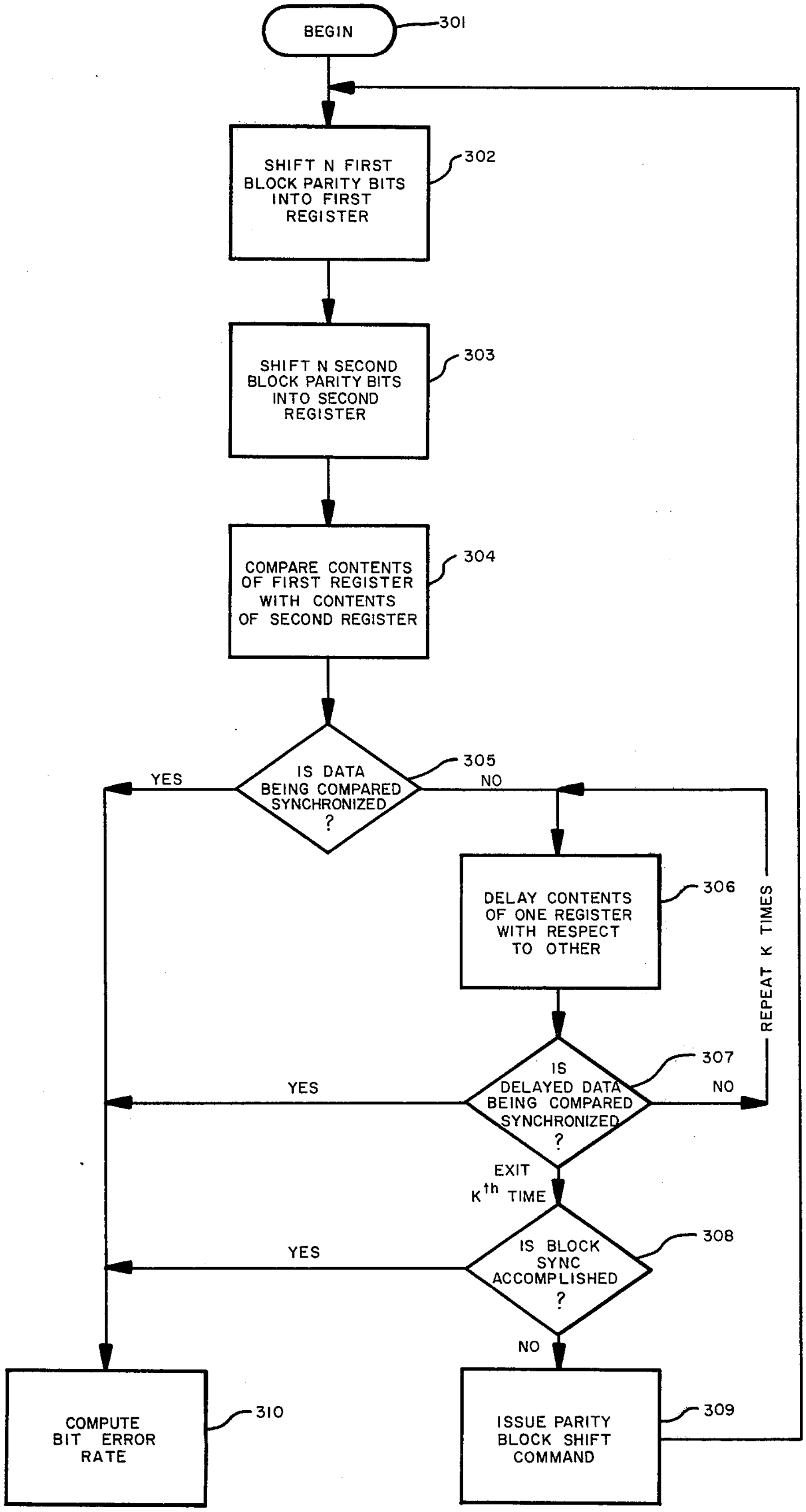
FIG. 3 is a more detailed flow diagram of the invention.

FIG. 3 is a more detailed flow diagram of the technique just described utilizing registers for storage, delay, and comparison. The process begins 301 and N number of block parity bits are shifted into a first shift register 302. These are generally the parity bits generated by parity check generator 106 for the data on the transmission end of the system in response to blocks of data transmitted. Similarly, N number of block parity bits are shifted into a second shift register 303. These N block parity bits are those generated by parity check generator 107 at the receive end of the system in response to blocks of data received. Both shift registers are located at the transmit end of the system such as in comparator 10 or computer 111. In this particular embodiment; however, implementation can be accomplished as well by locating the shift registers at the receive end of the system. The contents of the first register are compared with the contents of the second register 304. A determination is made whether or not the data being compared is synchronized and if the data is synchronized (i.e., the parity bit generated in response to a given block of transmitted data is compared to the parity bit generated in response to that same block of transmitted data which was actually received), then the bit error rate (BER) of the transmit/receive system is computed 310. However, if the data being compared is not synchronized 305, then the contents of one register with respect to the other register are delayed 306. Generally, the delay consists of merely one bit and is accomplished by shifting the contents of the one register with respect to the other register by one bit. A determination is then made to determine whether or not the delayed data now being compared in the two registers is synchronized. If it is, then the bit error rate BER is computed 310; but if it is not synchronized, then the contents of one register are delayed once again by shifting one more bit and this process is repeated until either synchronization is obtained wherein the bit error rate BER is computed 310, or else a predetermined number of shifts have been made, i.e., the data has been delayed by a predetermined amount. If the entire contents of one register have been shifted relative to the contents of the other register and there is still no evidence of synchronization, (i.e., the comparison count has not been reduced below an acceptable rate indicating synchronization), then block synchronization is attempted by issuing a block shift command to parity check generator 106 which shifts the parity block in generator 106 one bit relative to the block in generator 107, i.e., a change in the block set for example from bits 1 to 100 to bits 2 to 101 relative to the transmit or receive block. In other words, if the contents of the receive block are held constant, then the contents of the transmitting block are changed and vice versa. Once block and data synchronization is accomplished, by repeating the above procedure until a "yes" results from step 308, the computer bit error rate may be calculated 310.

Generally, in using odd or even parity for a block of 100 bits one bit error in 100 can be detected. However, it cannot detect two bit errors in 100 bits since the parity will check again. However, if there were three bit errors per 100, it would detect this. There are, however, more sophisticated codes such as the BCH code which can detect many more than 1 bit error in a given block and may be used in this invention. However, the type of error code is not pertinent to the invention. Because the invention may be more easily explained in terms of the even-odd parity code, this code will be used in this disclosure.

Figure 4:
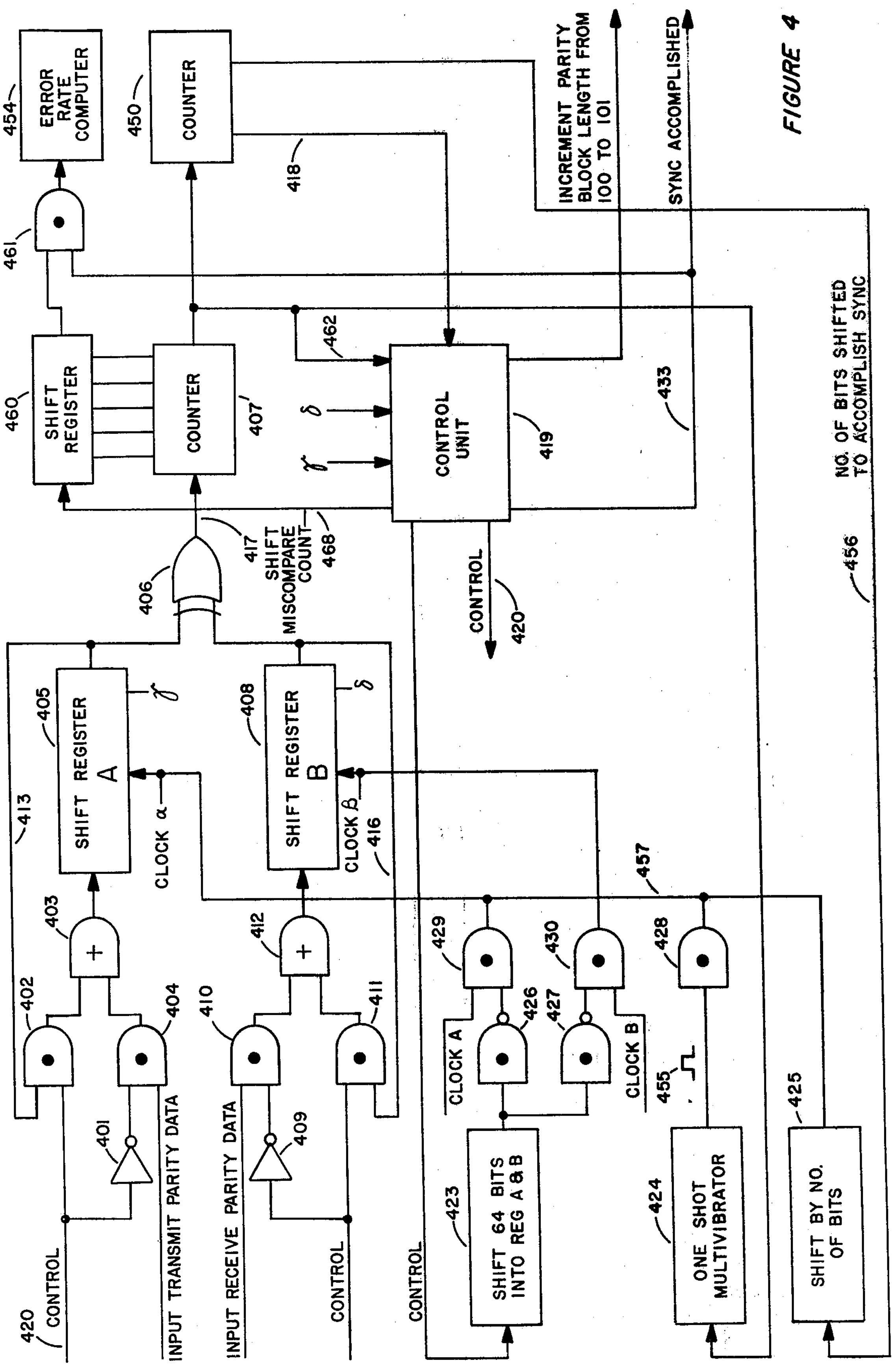
FIG. 4 is a logic block diagram of one embodiment of the invention.

Referring now to FIG. 4, there is shown a logic block diagram of one embodiment of the invention. Two data streams are shown applied to AND gates 404 and 410 respectively. The Input Transmit Data stream applied to AND gate 404 is comprised of the parity data generated at parity check generator 106 in response to blocks of data transmitted; the Input Received Data stream applied to one input of AND gate 410 is the parity data generated at parity check generator 107 in response to blocks of data recorded. The Input Transmit Data is shifted into a typical shift register A 405, which typically may be comprised of a series of flip-flops properly connected, or more commonly may be comprised of typical LSI devices such as TMS-3028 LC marketed by Texas Instrument Corporation. A control signal 420 is supplied from control unit 419 and is applied as an input signal to inverter 401 and also to AND gate 402. When the control signal 420 is low, AND gate 402 is not enabled; however, when control signal 420 is low, the output of inverter 401 is high and is applied as one input signal to AND gate 404. The other input signals are the Input Transmit Data, and when these signals are high, AND gate 404 is enabled and supplies a high output signal which is applied as one input signal of OR gate 403. This enables OR gate 403 and the input transmit data is introduced into shift register 405 under control of external clock $\alpha$. In a similar manner Input Receive Data from parity check generator 107 transmitted to comparator 10 will be shifted into shift register 408 under external clock $\beta$. Shift registers 405 and 408 may be of any size but for this embodiment have been selected to be 64 bits in length. As previously discussed, each parity bit checks the accuracy of a block of data 100 bits in length; therefore, each shift register holds sufficient parity bits to check the accuracy of 6,400 bits of data transmitted. If the parity bits contained in register A are synchronized to correspond to the parity bits in shift register B cell for cell and represent the parity bits cell for cell for the same blocks of information transmitted and received, then a comparison of each cell of register A and register B will show whether the parity bits are identical; and therefore an indication is obtained that the information transmitted was the information received. Accordingly, therefore, a comparison of shift register A is made cell for cell with shift register B. This is accomplished in the following manner. When the 64th bit has been shifted into the last cells $\gamma$ and $\delta$ respectively or shift registers A and B, the control signal 420 generated by control unit 419 goes high. This high control signal 420 is applied as before to inverter 401 and AND gate 402. The output of inverter 401 then goes low and is applied as one input to AND gate 404 and disables AND gate 404 and accordingly no more input transmit data is shifted into shift register 405. However, the same control signal 420 in its high state is now also applied as one input signal to AND gate 402. Since shift register 405 is full, the overflow will be applied via line 413 as another input signal to AND gate 402. Accordingly, AND gate 402 is enabled and applies a high signal to OR gate 403 and the contents of shift register 405 will recirculate under external clock $\alpha$ through shift register 405. In a similar manner, recirculation of shift register 408 is accomplished under external clock $\beta$. This recirculation is accomplished at a much greater rate of speed than the received Input Transmit and Input Receive Data and hence no data is lost during this process. As this recirculation in the two shift registers is taking place, a comparison is made cell for cell in exclusive OR gate 406. It should be noted here that the truth table of an exclusive OR gate is such that when there is a difference between the two input signals of the exclusive OR gate, there is an output high signal at the output terminal of exclusive OR gate. Hence, if one input signal were high and the other input signal were low, a high signal would result at the output 417 of the exclusive OR gate 406. On the other hand, when both input signals are identical, both high or both low, no output signal results at the output terminal of exclusive OR gate 406. Accordingly, therefore, exclusive OR gate 406 whose output is coupled to a counter 407, determines the number of miscompares and stores them in the counter 407. Hence, for example when all 64 bits in shift registers A and B have been compared, and there are 8 counts in counter 407, it indicates that there are 8 errors in 6,400 bits of data transmitted, or a bit error rate BER of 1/800th or 0.125 percent. This condition would be true if there was synchronization between bits in shift register A and shift register B. However, it is very rare that there is synchronization, when a system is first started up and accordingly the system must be synchronized so that representative bits of identical blocks of information are compared, and also of identical information within the blocks. The first as previously noted is termed block synchronization whereas the latter is termed data synchronization. For purposes of illustration, therefore, assume that there is no synchronization of data. Under this condition, the comparing of parity data in the two shift registers A and B has no significance with respect to the same data transmitted and presents a random comparison. Accordingly, any bit in a cell of shift register A may or may not compare to any bit in a comparable cell of shift register B. The bit miscompare rate should be expected to be 50 percent under these conditions. Therefore, if counter 407 has a 32 count capacity, and upon completion of the recirculation of the 64 bits in shift registers A and B, counter 407 is full, (i.e., has an over-flow bit), then a 50 percent miscompare rate is indicated. Generally, this indicates lack of synchronization. For the purposes of this embodiment, a 16 bit counter 407 is utilized which indicates, when an overflow condition results, that a miscompare of 25 percent is present and accordingly, synchronization is necessary. When such a condition is present, and an overflow bit results at counter 407, it is applied to one shot multivibrator 424 which generates a single pulse 455 in response thereto. This pulse 455 is then applied through AND gate 428 to shift register 405, and shifts that register by one bit while simultaneously entering a new bit to shift register 405. (Note that shift register B is not shifted and therefore each cell of shift register A has moved in relation to each cell of shift register B but no new data has been introduced into the shift registers). The comparison procedure just described is once again performed by recirculating another 64 bits through shift register A and B, whereupon another determination is made via counter 407, whether or not synchronization of data has resulted. If no synchronization has resulted, shifting another bit position of register A relative to register B is performed again, and these procedures are repeated for a total of 64 times or until synchronization has resulted. If synchronization has not resulted after 64 such shifts and recirculations then the implication is that the system is out of block synchronization, i.e., the blocks of data at point 113 for which parity is generated 107 contain different data than the blocks of data at point 112 for which parity is generated 106. Accordingly, block synchronization is necessary. Note that if block synchronization is necessary, counter 407 will overflow 64 times; each time this overflow occurs in addition to generating pulse 455, counter 450 will be activated and stores the total number of overflows of counter 407. Counter 450 may be any length so that when an overflow occurs it indicates block synchronization is necessary by providing a signal via line 418 to control unit 419 which in turn generates a command to parity check generator 106 to increment parity block length from 100 to 101.

Figure 8:
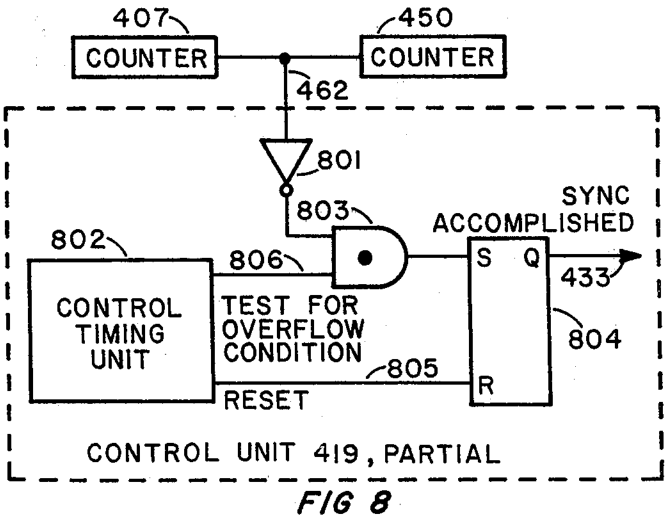
FIG. 8 is a logic block diagram of the portion of the invention which generates the signal which indicates that synchronization has been accomplished.

When synchronization has been accomplished there will not be an overflow in counter 407 which will result in a low level signal 462 being presented as an input to control unit 419. This condition will be sensed by control unit 419 at the proper time and a sync accomplished signal 433 will change from a low state to a high state. The generation of the sync accomplished signal is best explained with the aid of FIG. 8 which is a logic block diagram of that portion of control unit 419 which generates the sync accomplished signal. Signal 462, which is a low level when no overflow occurs in counter 407, presents a high level signal at the input of AND gate 803 due to the action of inverter 801. Control timing unit 802 presents a high level signal 806 to the other input of AND gate 803 at the proper time in the operation sequence, which is immediately after a shift sequence in which all bits of shift register 405 and 408 have been circulated and simultaneously compared by exclusive OR gate 406. When both inputs to AND gate 803 are high level signals, the output is a high level which causes flip-flop 804 Q output 433 (sync accomplished signal) to change from a low level to a high level signal. Reset signal 805 resets flip-flop 804 at the completion of the parity bit comparison sequence.

Referring now to FIG. 4, the sync accomplished signal 433 is presented as an input to AND gate 461 which serves to gate the contents of shift register 460 to error rate computer 454. The contents of shift register 460 consists of parity bit miscompare counts which are accumulated in counter 407 and shifted to shift register 460 at the proper time by shift signal 468 from control unit 419.

An additional feature in resynchronizing the system once synchronization has been accomplished and lost due to cessation of data transmission or because of other causes, is the storage in counter 450 of the number of bits of delay required to synchronize the system. Earlier it was shown that for each overflow of 407, counter 450 was advanced by one. Hence, if it required five shifts of register 405 relative to register 408 indicating five overflows of counter 407, a count of five would be maintained in counter 450. This count can therefore be used to quickly shift register 405 by the number of bits in counter 450 and hence obtain fast synchronization for subsequent 64 bit sets of parity data. This shift is accomplished from counter 450 via lines 456 through a register or another down counter mechanism 425 and to connecting line 457 and clock $\alpha$.

Figure 5:
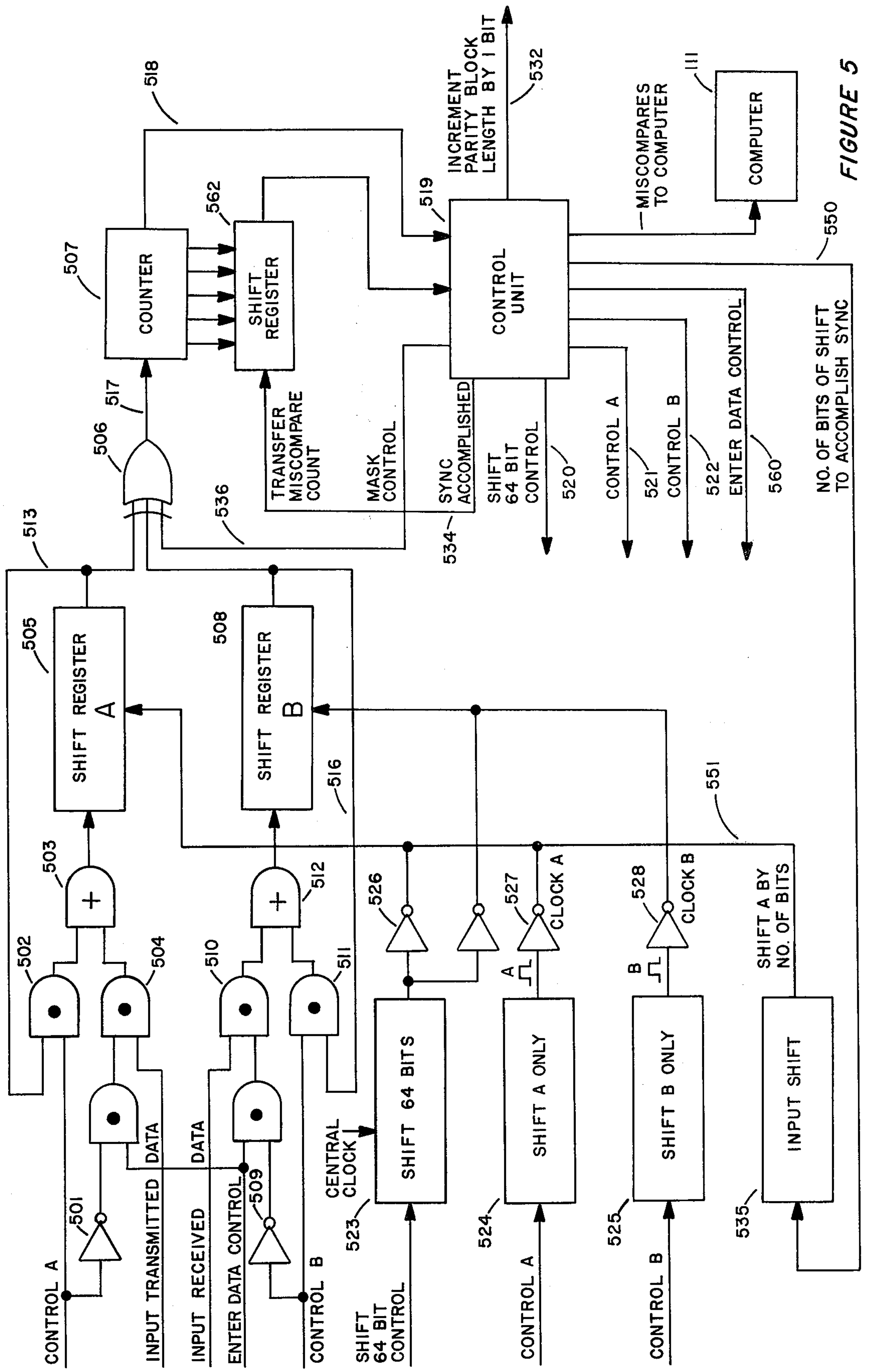
FIG. 5 is a logic block diagram of another embodiment of the invention.

Referring now to FIG. 5, there is shown another embodiment of the invention wherein shift register A may be shifted relative to shift register B, or shift register B may be shifted relative to shift register A. Basically input transmitted data and input received data is shifted into shift registers A and B respectively in a manner similar to that indicated in the prior discussion with respect to FIG. 4. The contents of shift register A are compared cell for cell with the contents of shift register B, in exclusive OR gate 506, by recirculating the data in shift registers A and B via recirculation lines 513 and 516 respectively. Elements 501, 502, 503 and 504 of FIG. 5 have a similar function as elements 401, 402, 403 and 404 respectively of FIG. 4. Similarly, elements 509, 510, 511, and 512 of FIG. 5 have similar functions as elements 409, 410, 411, and 412 respectively of FIG. 4. Shift register 505 is similar to shift register 405; and also shift register 508 is similar to shift register 408 and these shift registers perform the same functions. Similarly, exclusive OR gate 506 performs the same function as exclusive OR gate 406. Therefore, an overflow in counter 507 indicates non-synchronization bit for bit, and generates either control signal A 521 or control signal B 522 depending on which shift register A or shift register B is to be shifted. It matters not which shift register is shifted as long as the shift is relative to the other i.e., one shift register remains steady while the other shift register is shifted. The control unit 519 selects either shift register A or shift register B to be shifted on factors such as loading of circuits, these factors not being pertinent to the invention. Assuming, therefore, that shift register B 508 is to be shifted one bit, control signal B 522 goes high and is applied to one shot multivibrator 525 which generates a single pulse which is applied to inverter 528 and shifts register B 508 by one bit. If on the other hand, shift register A 505 were to be shifted instead of shift register B 508, control signal A 521 would go high and apply a high signal to single shot multivibrator 524 which in turn generates a clock pulse A which is applied to inverter 527 and accordingly shifts register A by 1 bit. The 64 bits now shifted by one bit are once again compared and if an overflow condition results again in counter 507 synchronization of data between register A and register B has not been attained and further attempts at synchronization is needed. The process is repeated for a total of 64 times or until synchronization has been attained. If after 64 times parity data synchronization has not been attained indicated by an overflow bit in counter 507 then block synchronization is required. This is achieved as follows: Parity block synchronization is achieved by alternately issuing command signal 532 (increment parity block length by one bit) and repeating the above described process until counter 507 no longer overflows, which indicates parity block synchronization and parity bit synchronization. This alternating procedure may have to be repeated a maximum of 100 times in this particular embodiment. The maximum number of repeats is equal to the number of data bits per parity block. The process of parity block synchronization is best described with the aid of FIG. 7 which is a logic block diagram of a parity check generator 106. Parity check generator 107 is the same as 106 with the exception that 107 connects to lines 120, 113, and 109 rather than lines 121, 112 and 122 which is utilized by parity check generator 106; however, this command could also be issued to 107 as explained previously. Command 532 is produced by control unit 519 upon receipt of a signal from counter 507 due to an overflow as a result of an out of parity block synchronization condition. Command 532 will cause unit 106 to increment parity block length by 1 bit. Since command 532 is transmitted only to parity check generator 106 and not to parity check generator 107, the effect will be to shift the parity block of unit 106 by one bit with respect to the parity block of unit 107. Repeating this process will ultimately result in a synchronization of parity blocks in unit 106 with parity blocks in unit 107, i.e., unit 106 will be computing parity over the same block of transmitted data bits as unit 107 for received data bits.

Figure 7:
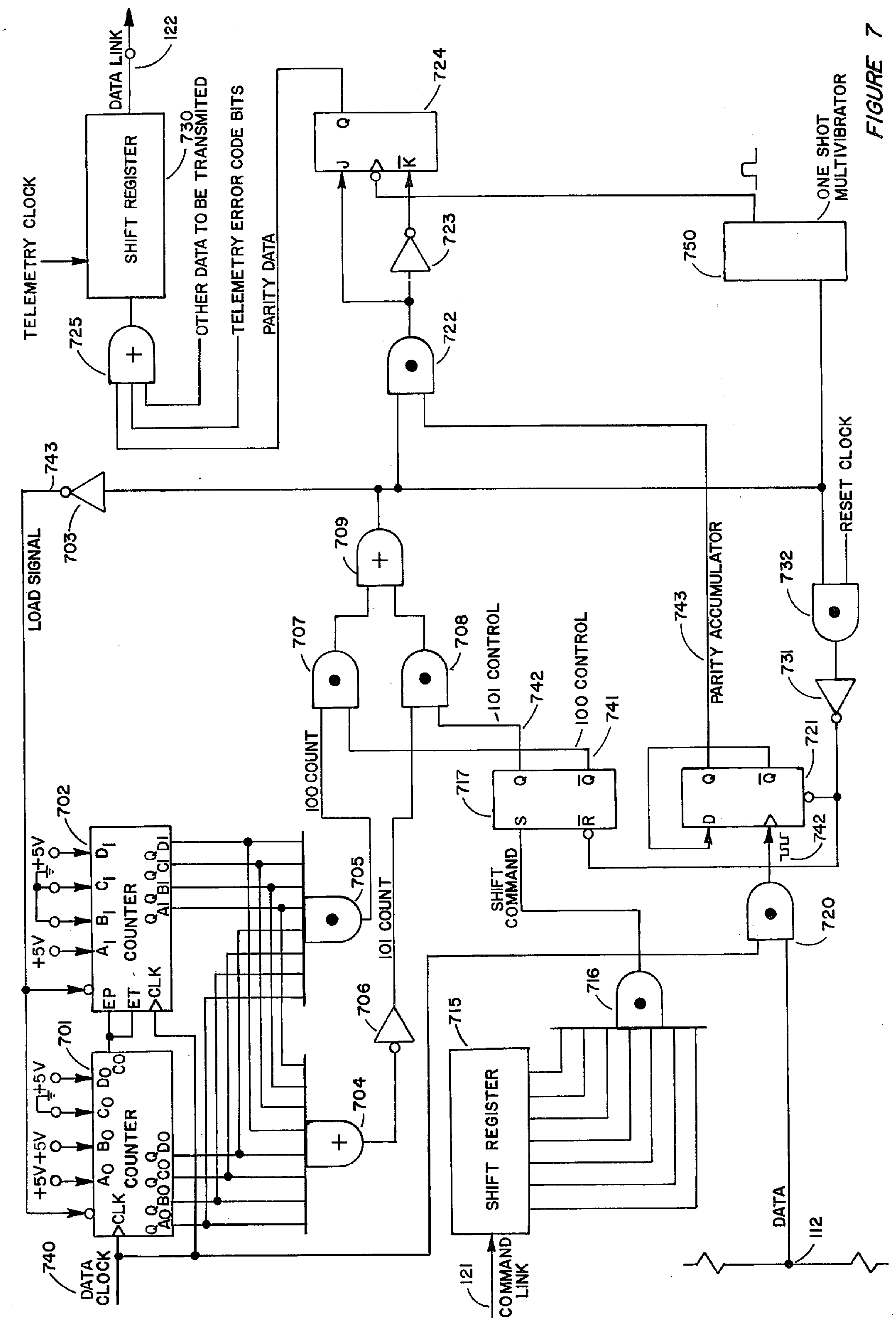
FIG. 7 is a logic block diagram of a portion of the invention which performs the function of parity check generation and parity block synchronization.

Command 532 is transmitted serially to 106 via command link 121 and enters shift register 715, shown on FIG. 7. Command 532 consists of a code which is decoded by AND gate 716 which in turn causes the Q output of flip-flop 717 to change from a low to a high state and correspondingly the $\overline{Q}$ output of flip-flop 717 to change from a high to a low state. The Q and $\overline{Q}$ outputs of flip-flops 717 are control signals applied to AND gates 707 and 708 which changes the parity block length from 100 data bits to 101 data bits for the next parity block.

Data clock signal 740 is counted by counters 701 and 702, which typically may be comprised of a series of flip-flops properly connected, or more commonly may be comprised of typical MSI devices such as SN74161 marketed by Texas Instrument Corporation. AND gate 705 decodes the 255th state of counters 701 and 702 causing the output of 705 to change from a low to high signal. This signal is applied to AND gate 707 which along with the 100 control signal 741 causes a signal 743 to propagate to the load inputs of counter 701 and 702 by way of OR gate 709 and inverter 703. Load signal 743 will cause counters 701 and 702 to be set to a count of 155 by virtue of the code selected at the A, B, C, and D inputs of counters 701 and 702. The operation and functions of counters 701 and 702 are described in greater detail on pages 325 to 333 of Texas Instruments *TTL Data Book*, first edition. The load signal is also employed with an appropriate reset clock pulse to reset the interval control flip-flop 717 and the parity accumulator flip-flop 721.

Loading counters 701 and 702 with a count of 155 at the point in time when the counter has reached a count of 255 results in a count interval of 100 data bits per parity block. OR gate 704 decodes a count of 0, which is the next incremental state beyond state 255 of counters 701 and 702 and results in a count interval of 101. As described above counters, 701 and 702 will count intervals of 100 or 101 data bits per parity block by enabling either AND gate 707 or 708 respectively which is under control of flip-flop 717 which in turn receives and stores command 532 to increment parity block length by 1 bit.

In this particular embodiment, a normal parity block length of 100 was employed in conjunction with a shift block length of 101. Other parity block can be employed and can be implemented by simply changing the preset number in the counter, by applying a different code to the A, B, C & D inputs to counters 701 and 702.

For example, a preset count of 55 instead of 155 will result in a normal count interval of 200 and a shift count interval of 201. Other count intervals can be implemented based on system requirements such as telemetry data rate, data source 101 rate, telemetry error detection code requirements, additional telemetry information content requirements, data source error rate resolution, etc.

The previous discussion has described a means of generating parity block intervals, receiving shift command and a means to increment the parity block interval by one bit in response to this command. Parity check generation will now be discussed in relation to the above process. Referring to FIG. 7, data is monitored at point 112 by AND gate 720 which also has data clock 740 as an input. The output of AND gate 720 is clock pulses 742 produced when data is a logic 1 (high level). The number of pulses 742 equals the number of logic 1 bits at point 112. This output is presented to the clock input of flip flops 721 which functions as a parity accumulator by changing states for each pulse 742 from gate 720. If an odd number of pulses 742 occur (created by an odd number of logic 1 data bits) during a parity block interval (normally 100) then the output 743 of the parity accumulator flip flop will be a high signal level. Likewise if an even number of pulses 742 occur (created by an even number of logic 1 data bits) then the output 743 will be a low signal level. The output 743 is presented to AND gate 722 which when gated with the output of gate 709 results in the transfer of the result of the parity accumulator to the parity data flip-flop 724 through AND gate 722 and invertor 723 coincident with the pulse from one shot multivibrator 750. The parity data bit computed over 100 data bits is presented to OR gate 725 which in turn transfers to the output shift register 730. The contents of shift register 730 are transmitted to comparator 10 via data set 108 and data link 122. Comparator 10 compares parity bits from parity check generator 106 with the parity bits from parity check generator 107 as previously described.

When block synchronization and data synchronization has been accomplished utilizing these tehcniques then the miscompares or the number of bits in counter 507 is a measure of the number of errors for the total data represented by the parity bits in shift register A or B. Accordingly, the number of miscompares in counter 507 are transmitted to the control unit via line 518 and then to the computer 111 where the BER bit error rate is computed.

Note that this embodiment also has the unique feature of keeping track of the number of shifts of register A or register B in order to accomplish synchronization and is utilized to obtain quick synchronization by shifting either register A or register B by that number of bits via circuit 550, 535, 551, 552.

Figure 6:
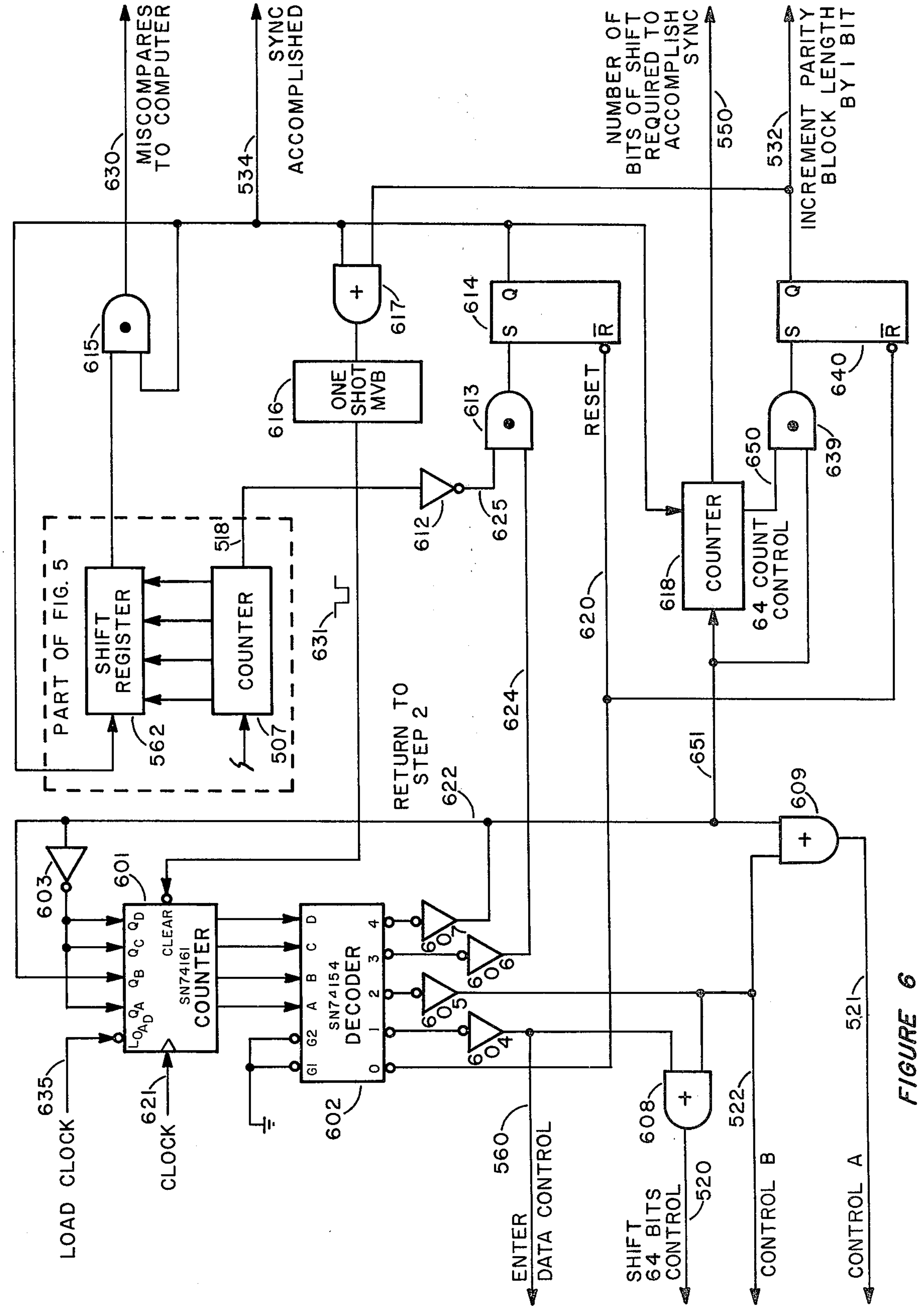
FIG. 6 is a more detailed logic block diagram of the control unit shown in FIG. 5.

Referring now to FIG. 6, there is shown a detailed logic block diagram of control unit 519 which is included on FIG. 5. Control unit 519 generates the various control signals which results in comparator 10 performing a series of sequential operations required to receive and process parity bits from the parity check generators 106 and 107. There is shown a step counter 601 and decoder 602 which typically may be comprised of a series of flip-flops properly connected, or more commonly may be comprised of typical MSI devices such as SN74161 and SN74154 marketed by Texas Instrument Corporation and described in detail on pp. 325–333 and 308–311, respectively of Texas Instruments *TTL Data Book*, first edition. The operation of counter 601 in conjunction with decoder 602 is such to cause a low level reset signal 620 followed by high level signals at the outputs of inverters 604, 605, 606, and 607 in a sequential manner in response to external clock signal 621.

The following sequence of operations steps is followed which is described in detail later:

Step 0 — initialize
Step 1 — Enter two sets of 64 data bits and shift data by element 535 if sync had been accomplished during previous step 3.
Step 2 — Circulate parity bits and compare
Step 3 — Check for miscompare overflow
1. If overflow, advance to step 4
2. If no overflow, transfer contents of counter 507 to computer 111, transfer contents of counter 618 to element 535 and return to step 0.

Step 4
1. Issue control A to shift one parity bit in register 505.
2. Increment counter 618 by 1.
3. If counter 618 is less than 64, return to step 2
4. If counter 618 is 64, issue command 532 to increment parity block length by 1 bit and return to step 0.

In this particular embodiment, a total of five operational steps were employed (steps 0, 1, 2, 3, and 4 as shown at the output of decoder 602); however, additional operational steps can be added up to a maximum of 16 by following the instructions from the previously referenced *TTL Data Book.* Additional operational steps merely increases processing capacity and versatility of comparator 10 and as such is not essential to the invention. Step 0 initializes the system by causing a low level signal 620 to reset flip flops 614 and 640. The next clock pulse 621 increments counter 601 causing decoder 602 output 1 to change to a low level signal which in turn causes the "enter data control" signal 560 to change to a high level due to the operation of inverter 604. Signal 560 causes the "shift 64 bit control" signal to become high through OR gate 608. As described previously, the effect of these two signals is to shift two sets of 64 new parity bits into shift registers 505 and 508. The next clock pulse 621 similarly increments counter 601 and decoder 602 to step 2 resulting in a high level signal for control A 521, control B 522 and shift 64 bit control 520 by action of OR gate 608, OR gate 609 and inverter 605. These signals cause comparator 10 to circulate 64 bits in registers 505 and 508 while simultaneously accumulating miscompares in counter 507 as previously described. The next clock pulse 621 similarly increments counter 601 and decoder 602 to step 3 which presents a high level signal 624 to AND gate 613 through inverter 606. If an overflow has resulted in counter 507 due to the fact that parity synchronization has not been attained, then a low signal 625 is presented to the other input of AND gate 613 through inverter 612. Under the condition that signal 624 is high and signal 625 is low, the output of AND gate 613 is low and flip-flop 614 output signal (sync accomplished 534) remains low resulting in counter 601 advancing to step 4 upon application of the next clock pulse 621.

If, however, parity synchronization had been attained producing a high level signal 625 by action of counter 507 (no miscompare overflow) and inverter 612, then the output of AND gate 613 would have been a high level signal during step 3 resulting in flip flop 614 output signal 534 to change from a low state to a high state. The following action is taken: Sync accomplished signal 534 is presented to shift register 562 causing the data content of 562 (correct miscompare count of the two sets of 64 parity bits) to be shifted to computer 111 via line 630 through AND gate 615 which also has as an input the sync accomplished signal 534. The sync accomplished signal 534 is also presented to one-shot multivibrator (MVB) via OR gate 617 producing pulse 631 which clears counter 601 and causes the control unit to return to the initial step 0.

Returning now to the previous condition in which parity synchronization had not been attained (overflow in counter 507 existed) and the state of counter 601 advanced from step 3 to step 4. During step 4, signal 622 is a high level causing control A 521 (via OR gate 609) to be high resulting in a 1 bit shift of the parity bits in register 505 as previously explained. Also, the counter is returned to step 2 by action of inverter 603 and signal 622 applied as inputs to counter 601 in the form of code 2 (0010). Counter 601 changes from step 4 to step 2 coincident with the load clock 635. Operational steps 2, 3, and 4 are repeated until parity synchronization has been attained during step 3 or until a count of 64 in counter 618 has been attained causing "64 count control" 650 to change to a high state. Counter 618 is incremented once during each step 4. Signal 650 in conjunction with signal 651 (step 4 control) causes flip flop 640 Q output "increment parity block length by 1 bit" 532 to change to a high level which in turn causes the counter 601 to return to step 0 by action of one-shot multivibrator 616 via OR gate 617.

Counter 618 has a dual function which is employed under the condition that parity synchronization has been attained. Counter 618 contains in binary form a count of the number of bits required to accomplish sync. This count is transferred to register 535 shown on FIG. 5 via line 550 by action of the sync accomplished signal 534 which is applied to counter 618. As previously explained, this count is utilized to process the miscompare counts for future sets of 64 parity bits during step 1 once sync has been attained. The advantage is to eliminate many repetitions of operations steps 2–4 thereby eliminating considerable process time.

What is claimed is:

1. An apparatus for in-service monitoring the accuracy of electronic data transmitted over a first communication channel or telemetry link comprising:

a. first means, in a first system, for generating in response to said electronic data transmitted over said first communication channel or telemetry link a first error code for a unit of said data transmitted over said first communication channel at a first transmission rate;

b. second means, in a second system, for generating in response to said electronic data received over said first communication channel or telemetry link a second error code for said unit of data received over said communication channel at said first transmission rate;

c. third means, in said second system coupled to said second means, for continuously transmitting at a second transmission rate slower than said first transmission rate said second error code to said first system over a second communication channel;

d. fourth means, in said first system coupled to said first means, for comparing said first error code of said unit of data transmitted with said second error code of said unit of data received; and e. fifth means, coupled to said fourth means, for calculating the bit error rate (BER) i.e. number of errors per unit of said data transmitted from said first system to said second system.

2. An apparatus as recited in claim 1 including sixth means coupled to said fifth means for comparing said BER to a predetermined value.

3. An apparatus as recited in claim 2 including seventh means, coupled to said fourth means and to said sixth means, for time-delaying said first error code relative to said second error code when said BER exceeds said predetermined value and prior to comparing said first error code with said second error code.

4. An apparatus as recited in claim 3 including eighth means coupled to said seventh means, for repeating said time-delay and comparison of said first error code until said BER is less than said predetermined value.

5. An apparatus as recited in claim 4 including ninth means, coupled to said eighth means, for terminating said time-delay and comparison of said first error code after a predetermined number of times, if said BER remains greater than said predetermined value.

6. An apparatus as recited in claim 5 including tenth means, coupled to said ninth means, for introducing a new data list in said unit of data received, and further including eleventh means for comparing said first error code in said unit of data transmitted with said second error code in said unit of data received.

7. A method for in-service monitoring the accuracy of electronic data transmitted over a communication channel or telemetry link comprising the steps of:

a. generating in a first site first error codes, one each for each unit of data (i.e. block) being transmitted;

b. generating in a second site second error codes, one each for each unit of data (i.e. block) being received;

c. transmitting said second error codes in said second site to said first site;

d. comparing said second error codes with said first error codes; and, e. determining if the comparison is synchronized to the same unit of data so that the first error code in said first site is compared for the same unit of data to the second error code transmitted from said second site to said first site.

8. The method as recited in claim 7 including the further step of obtaining data synchronization if there is block synchronization by time delaying said second error codes with respect to said first error codes.

9. The method as recited in claim 8 including the further step of obtaining block synchronization if there is no data synchronization by introducing a new data bit within said block.

10. An apparatus for monitoring the accuracy of electronic data transmitted over a communication channel or telemetry link comprising:

a. first means for generating error codes one each for each unit of data (i.e. block) transmitted from a transmitting station;

b. second means for generating error codes one each for each unit of data (i.e. block) received at a receiving station;

c. third means, coupled to said second means, for transmitting said error codes from said receiving station to said transmitting station;

d. fourth means, coupled to said first means and to said third means, for determining whether or not there is data and block synchronization; and, e. fifth means, coupled to said fourth means, for calculating bit error rate, BER of data received at said receiving station.

11. An apparatus for monitoring the accuracy of electronic data transmitted over a communication channel or telemetry link comprising:

a. first means for generating error codes one each for each unit of data (i.e. block) transmitted from a transmitting station;

b. second means for generating error codes one each for each unit of data (i.e. block) received at a receiving station;

c. third means, coupled to said first means, for transmitting said error codes from said transmitting station to said receiving station;

d. fourth means, coupled to said first means and to said third means, for determining whether or not there is data and block synchronization; and, e. fifth means, coupled to said fourth means for calculating bit error rate BER of data received at said receiving station.

* * * * *